July 7, 1953    W. S. PRAEG    2,644,369
BROACHING MACHINE
Filed May 17, 1948    2 Sheets-Sheet 1
FIG.1.
FIG.4.
FIG.5.
FIG.6.
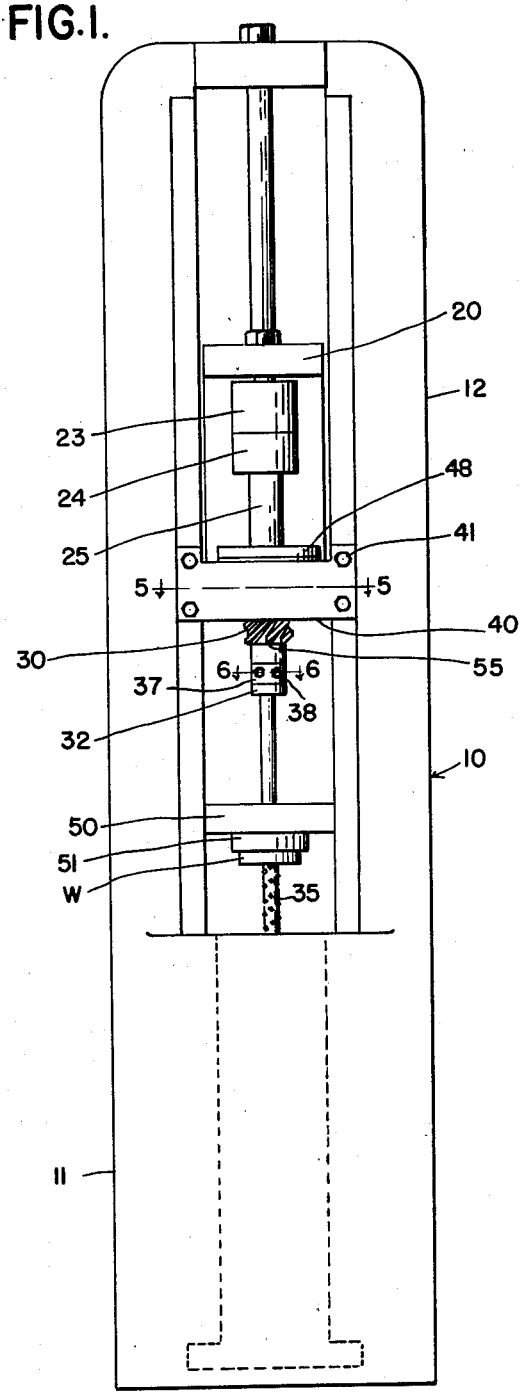
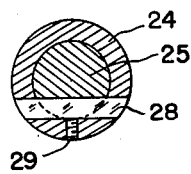
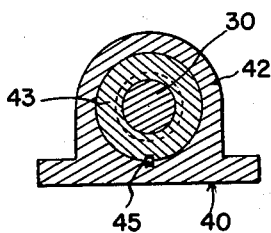
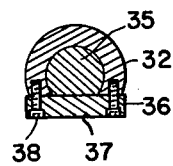
*INVENTOR.*
WALTER S. PRAEG
BY
Whittemore, Hulbert
& Belknap   ATTORNEYS July 7, 1953 — W. S. PRAEG — 2,644,369
BROACHING MACHINE
Filed May 17, 1948 — 2 Sheets-Sheet 2
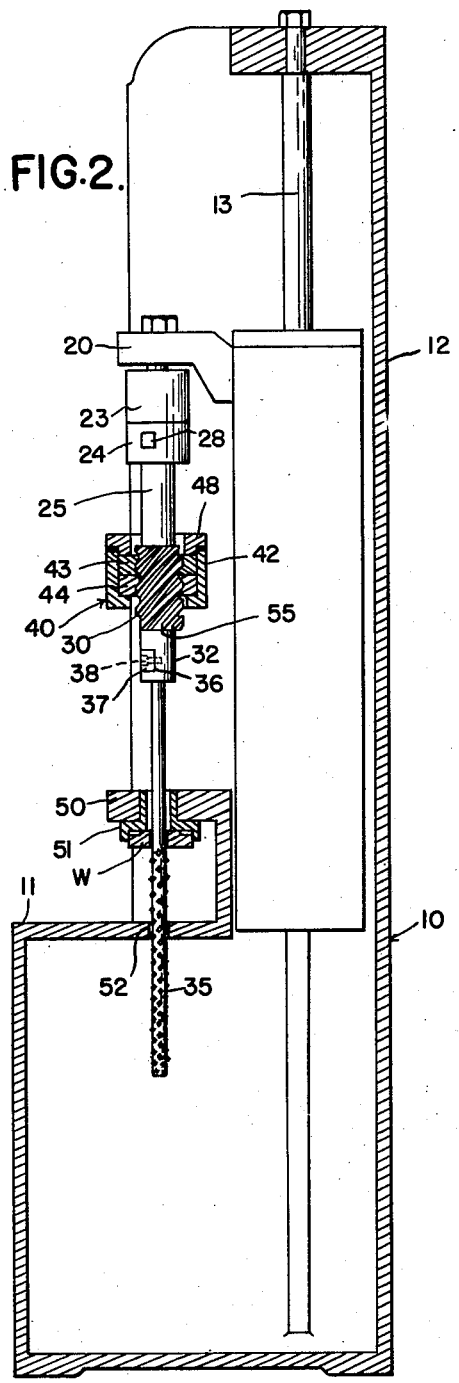
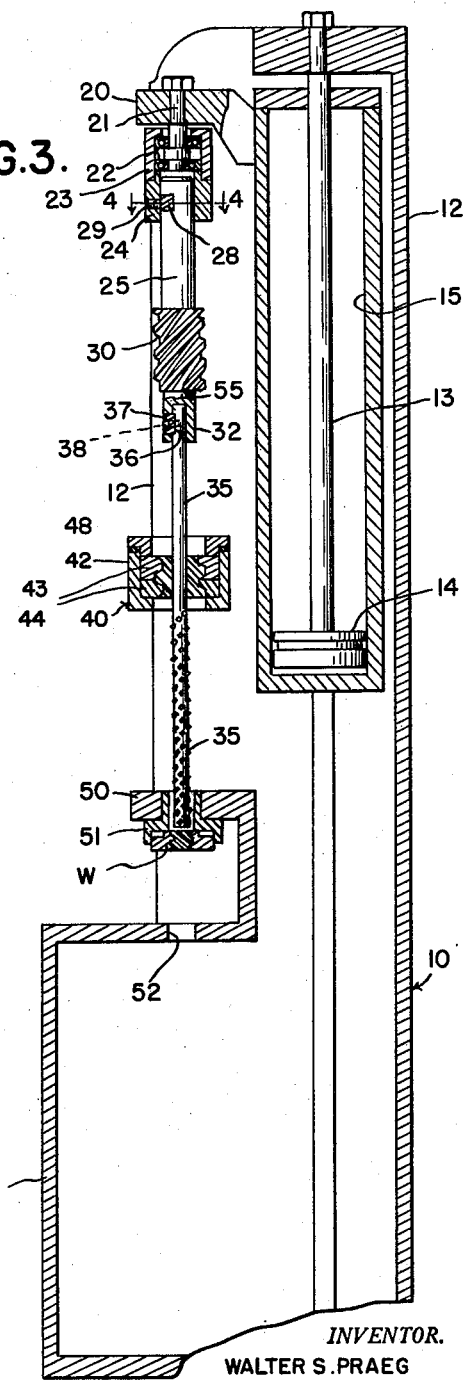
INVENTOR.
WALTER S. PRAEG
BY
Whittemore, Hulbert
& Belknap
ATTORNEYS Patented July 7, 1953

2,644,369

UNITED STATES PATENT OFFICE 2,644,369

BROACHING MACHINE

Walter S. Praeg, Detroit, Mich., assignor to National Broach & Machine Company, Detroit, Mich., a corporation of Michigan Application May 17, 1948, Serial No. 27,420

6 Claims. (Cl. 90—10)

The present invention relates to method and apparatus for broaching helical parts.

Helical parts such as internal gears have in the past been broached by drawing or otherwise forcing a broach having helically disposed cutting teeth therethrough. In general two methods have been relied upon for establishing and maintaining the necessary relative rotation between the work piece and the broach as the broach is drawn through the work. This may be accomplished by mounting either the broach or the work piece for free relative rotation in which case reliance is placed upon guiding action established between gear teeth as they are formed on the work piece and the helical teeth of the broach. Alternatively, positive relative rotation between the broach and the work piece has in some cases been employed.

Both of these methods have objections. If the broach and work piece are mounted for free relative rotation, there is a certain amount of resistance which results in removal of some stock from within the desired profile of the gear teeth adjacent the top thereof. If reliance is placed upon positive acting guiding means, a source of error is introduced. This is particularly true where rotation is transmitted to the broach or work piece through change gearing. If positive acting guiding means are provided in the form of a guide bar formed coaxially with the broach, the overall length or height of the apparatus is substantially increased.

Modern broaches are formed to an extremely high degree of accuracy and if reliance can be placed upon the guiding action established between teeth as they are formed on the work piece and the broach, gears of extreme accuracy can be produced. In order to avoid the removal of stock beneath the desired profile of the gear teeth which takes place during initiation of a broach stroke, and at the same time to preserve the ultimate accuracy which is obtainable only when the guiding action during the final operation is dependent solely upon engagement between the gear and the work piece, and at the same time to reduce the over-all length or height of the gear broaching machine, the present apparatus has been developed.

According to the present invention positive acting guide means, preferably in the form of a guide bar and nut disposed coaxially of the broach, are employed. The guide bar is, however, of substantially less axial extent than the cutting portion of the broach. It is disposed with respect to the guide nut so that the positive acting guiding is in effect upon initiation of the cutting stroke. Since the guide bar is of substantially less length than the cutting portion of the broach, it passes beyond the guide nut during the broaching stroke, after which relative rotation between the work piece and the broach is thereafter dependent solely upon their interengagement, so that the final accuracy of the finished work piece is dependent upon the accuracy of the broach.

With the foregoing general remarks in mind it is an object of the present invention to provide a method and apparatus for broaching helical parts in which the broach and work piece are positively guided during only the first portion of the cutting stroke.

It is a further object of the present invention to provide a method and apparatus for broaching helical parts in which the broach and work piece are positively guided in relatively helical paths for somewhat less than the first half of the cutting stroke and are thereafter guided in the desired relative helical path solely by their interengagement.

It is a further object of the present invention to provide apparatus for broaching helical parts comprising a drawbar for supporting a broach, the drawbar having helically disposed guiding teeth thereon, a nut for engaging the helical teeth, the nut and teeth being in engagement for less than half and preferably for approximately the first one-third of the broaching stroke.

Other objects and features of the invention will become apparent as the description proceeds, especially when taken in conjunction with the accompanying drawings, wherein:

Figure 1 is a front elevation of gear broaching apparatus constructed in accordance with the present invention.

Figure 2 is a side elevation partly in section of the apparatus illustrated in Figure 1 showing the broach in position to initiate its cutting stroke.

Figure 3 is a side elevation partly in section showing the breach in position which it occupies upon completion of the breaching stroke.

Figure 4 is a section on the line 4—4 of Figure 3.

Figure 5 is a section on the line 5—5 of Figure 1, and

Figure 6 is a section on the line 6—6 of Figure 1.

The gear finishing apparatus comprises a frame 10 having a forwardly projecting knee 11 and an upwardly projecting column 12. Secured to the top of the column 12 is a fixed piston rod 13 having piston 14 at its lower end. Mounted for vertical reciprocation relative to the piston 14 is a cylinder 15, suitable hydraulic connections (not shown) being provided for effecting vertical motion of the cylinder.

Projecting forwardly from adjacent the upper end of the cylinder 15 is an arm 20 to which is secured a headed stud 21. Suitable bearings 22, preferably of the ball type are provided for rotatably supporting a housing 23 on the headed stud 21. To the lower end of the housing is secured a collar 24 for connecting a broach drawbar 25 thereto. As illustrated in Figures 3 and 4, drawbar 25 is keyed to the collar 24 by the key 28 which is held in place by a clamp screw 29. The construction just described supports the drawbar 25 for free rotation with respect to the arm 20. The drawbar 25 adjacent its lower end is provided with a guide portion 30 formed of helically disposed teeth and these teeth are provided at the helix which it is desired to reproduce on a work piece. Accordingly, the drawbar 25 is replaceable and the appropriate drawbar for a particular work piece will be selected and employed.

At its lower end the drawbar 25 has a socket portion 32 for receiving the upper end of a broach 35. As best seen in Figures 3 and 6 the broach adjacent its upper end has a recess 36 which is engaged by a traverse bar 37 bolted or otherwise secured at the socket portion 32 of the drawbar 25 by recessed bolts 38 or the like. This secures the broach 35 to the drawbar 25 in a rigid manner.

Extending across the front of the column 12 is a nut support 40 which is illustrated in Figure 1 as bolted or otherwise secured thereto as indicated at 41. The nut support 40 includes an upwardly open cup-like portion 42 which receives a pair of helical guide nuts 43 and 44. As best seen in Figure 5 the nuts 43 and 44 are keyed against rotation in the cup 42, the key being indicated at 45. The nuts 43 and 44 are retained in the cup by a clamping ring 48. The construction provides for taking up back lash if it developes between the composite nut and the guide portion 30 of the drawbar.

Means are provided for fixedly mounting a work piece W and this means is illustrated as comprising a forwardly projecting ledge 50 which is apertured to receive a work supporting fixture 51. An opening 52 is provided in the upper surface of the knee 11 to permit passage of the broach therethrough as indicated in Figure 2. It will be observed that the axial extent of the guide portion 30 of the drawbar is approximately one-third that of the cutting portion of the broach 35. The exact relative axial extent of the guide portion 30 is not critical but it should be less than half the length of the cutting portion of the broach and excellent results are obtained when its axial extent is approximately one-third that of the cutting portion of the broach 35.

Since the guide portion 30 of the drawbar comes out of the composite nut formed by the nut members 43 and 44, it is preferable to form the lower ends of the teeth of the guide portion 30 to facilitate their re-entry into tooth spaces in the guide nut. This construction is suggested at 55 in Figure 1 at which point the teeth of the guide portion 30 are illustrated as pointed. Obviously, of course, the upper ends of the teeth of the composite nut may be shaped in a similar manner.

The operation of the broach apparatus is believed obvious from the foregoing description but will be briefly reviewed.

With the parts in the relative position illustrated in Figure 3 a finished work piece W will be removed from the work holding fixture 51. The cylinder 15 will then be lowered to bring the socket portion 32 of the drawbar 25 into the position illustrated in Figure 2. At this time the broach is released from the socket 32, a new work piece W is positioned in the fixture 51, the broach is moved upwardly through the opening in the work piece and its upper end is engaged in the socket 32. At this time the helical guide composed of the guide portion 30 of the drawbar 25 and the composite nut made up of the nut elements 43 and 44 are in full engagement.

Fluid pressure is admitted to the cylinder 15 causing the cylinder to move upwardly thus drawing the broach 35 through the work piece. During initial movement of the broach through the work piece, the broach is positively rotated through the action of the helical guide means. When approximately one-third of the cutting portion of the broach has passed through the work piece, the guide portion 30 of the drawbar 25 will pass out of the guide nuts. This initial cutting operation is therefore effected with a positive helical guide so that the teeth are formed on the work piece with a true lead and without mutilation. By the time the cutting operation has been partially completed, an effective guiding action will be set up between the work piece and the broach. Thereafter this guiding action is relied upon for extending the balance of the cutting operation. Accordingly, the accuracy of the final finishing of the teeth of the work piece is dependent solely upon the accuracy of the teeth of the broach. Under present manufacturing conditions, the broach teeth may be held to extremely high degree of accuracy which is thus imparted to the teeth of the gear. It is found in practice that an internal gear having its teeth completely broached by this method is a precision gear which requires no further machining operations.

By employing a helical guide bar disposed coaxially with the broach and of substantially less axial extent than the cutting portion of the broach, the over all dimensions of the machine may be substantially reduced. The present machine is illustrated as a vertical type machine but it will be appreciated that the invention is equally applicable to a horizontal type of machine. In addition to the saving of space and metal resulting from the more compact character of the machine, the actual machining operation is improved. The start of the broaching operation which in the past has resulted in mutilation of the tops of gear teeth adjacent the internal diameter of the part when no positive acting guiding means was employed is carried out with positive acting guiding means which prevents such mutilation. At the same time the finish of the broaching operation is carried out with a guiding action between the broach and the work piece dependent upon engagement between the partially formed broached teeth and the teeth of the broach. This permits the final formation of the broach teeth to be as accurate as the teeth of the broach.

The broaching of internal gears when carried out by the present apparatus avoids a second source of possible error. In the past a guide bar coaxial with the broach and of a length equal to the length of the cutting portion of the broach has been employed. Accordingly, it is possible for the guide bar and nut to be of the same or smaller size than the broached part and broach respectively.

When the apparatus of the present invention is employed and when the guide bar is connected directly to the broach so as to reduce the over all dimensions of the apparatus as is desirable the forepart of the broach enters into the nut. Accordingly, the nut must have a larger internal diameter than the outside diameter of the broach. As a result of this the nut and guide bar assembly will be relatively rigid and the tendency to twist in use will be strongly resisted.

The present construction avoids possible relative twisting between the guide bar and broach for the reason that the separation between the nut and the part being broached is reduced to a minimum. As is well known the resistance to twisting of elongated structure varies inversely as the length of the structure. Accordingly, the present structure reduces errors which might result from relative twisting of the broach pulling mechanism between the guide bar and the part being broached for two reasons. In the first place, the guide bar is necessarily a heavier and more rigid part and in the second place, the effective length of the structure intermediate the nut and the working zone of the broach is reduced.

The drawings and the foregoing specification constitute a description of the improved broaching machine in such full, clear, concise and exact terms as to enable any person skilled in the art to practice the invention, the scope of which is indicated by the appended claims.

What I claim as my invention is:

1. Apparatus for broaching helical parts comprising a fixed work support, a broach puller carriage, a drawbar rotatably mounted on said carriage coaxially of said work support and having means at one end for releasably engaging a broach, helical guide teeth on said drawbar of an axial extent of approximately one-third the length of the cutting portion of the broach, a fixed guide nut of relatively short axial extent positioned to be engaged with the guide teeth at the end thereof remote from said broach engaging means upon initiation of cutting by the broach, the axial extent of the guide teeth and nut being such that the broach is rotated thereby during approximately the first third of the cutting stroke and is thereafter rotated solely by its engagement with the work piece.

2. Apparatus for broaching helical parts comprising a fixed work support, a broach puller carriage, a drawbar rotatably mounted on said carriage coaxially of said work support and having means at one end for releasably engaging a broach, helical guide teeth on said drawbar of an axial extent of approximately one-third the length of the cutting portion of the broach, a fixed guide nut of relatively short axial extent positioned to be engaged with the guide teeth at the end thereof remote from said broach engaging means upon initiation of cutting by the broach, the axial extent of the guide teeth and nut being such that the broach is rotated thereby during approximately the first third of the cutting stroke and is thereafter rotated solely by its engagement with the work piece, said nut being located close to said work support in position such that at least the fore part of said broach enters said nut during the cutting stroke, said nut and the helical teeth on the drawbar being of a size to provide clearance with respect to the portion of the broach entering said nut.

3. Apparatus for broaching helical parts comprising a broach support and a work support coaxial of said broach support, means for moving one of said supports axially toward and away from the other support and means retaining the other of said supports against axial movement, means mounting one of said supports for free rotation about its axis and means for retaining the other of said supports against rotation, helical guide means associated with said supports comprising a pair of engageable parts operatively connected to said supports for longitudinal displacement in accordance with the relative axial movement between said supports and for relative rotation to effect positive relative rotation between said supports in accordance with relative axial movement therebetween, a helical broach on said broach support for cutting helical elements on a work piece on said support, said parts being located and having dimensions parallel to the direction of displacement such that said parts are in cooperating guiding engagement during initiation of a cutting stroke and pass out of cooperating engagement during the cutting stroke to provide for forced guidance of the broach and work during initiation of a cutting stroke and subsequent guidance of the broach and work during the latter part of the cutting stroke to be solely dependent on engagement between the broach and work piece.

4. Apparatus as defined in claim 3 in which said work support is the support retained against axial and rotational movement.

5. Apparatus as defined in claim 4 in which the parts of said guide means comprises a stationary internally toothed part, and a movable externally toothed part rigidly connected to said broach support and movable in guided arrangement through said internally toothed part.

6. Apparatus as defined in claim 5 in which said internally toothed part is located closely adjacent to said work support and has an internal diameter sufficient to provide clearance for entrance of the broach thereinto.

WALTER S. PRAEG.

References Cited in the file of this patent

UNITED STATES PATENTS

| Number | Name | Date |
|---|---|---|
| 1,089,376 | Hanson | Mar. 3, 1914 |
| 1,218,191 | La Pointe | Mar. 6, 1917 |
| 1,318,488 | Donaldson | Oct. 14, 1919 |
| 1,925,837 | Jones et al. | Sept. 5, 1933 |
| 1,978,458 | Halborg | Oct. 30, 1934 |
| 2,161,901 | Praeg | June 13, 1939 |
| 2,173,901 | Edgar | Sept. 26, 1939 |
| 2,317,514 | Bonnafe | Apr. 27, 1943 |
| 2,357,094 | Edgar | Aug. 29, 1944 |
| 2,408,521 | La Pointe | Oct. 1, 1946 |

FOREIGN PATENTS

| Number | Country | Date |
|---|---|---|
| 424,956 | Great Britain | June 1, 1933 |